United States Patent [19]

Emery

[11] Patent Number: 5,761,820
[45] Date of Patent: Jun. 9, 1998

[54] PLUG GAGING MACHINE

[75] Inventor: Monti D. Emery, Elmira, N.Y.

[73] Assignee: Emhart Glass Machinery Investments Inc., Wilmington, Del.

[21] Appl. No.: 627,165

[22] Filed: Apr. 3, 1996

[51] Int. Cl.$^6$ ............... G01B 3/26; G01B 21/00
[52] U.S. Cl. ............... 33/522; 33/542; 73/865.8; 209/532
[58] Field of Search ............... 33/522, 548, 542, 33/542.1, 544, 501.05, 501.45; 73/865.8; 209/522, 523, 530, 531, 532

[56] References Cited

U.S. PATENT DOCUMENTS

| | | | |
|---|---|---|---|
| 3,196,550 | 7/1965 | McMeekin | 209/530 |
| 3,355,811 | 12/1967 | Tailleur | 33/522 |
| 3,422,542 | 1/1969 | Spurr | 33/522 |
| 3,815,248 | 6/1974 | Kulig | 33/522 |
| 3,866,753 | 2/1975 | Milton | 209/532 |
| 3,914,872 | 10/1975 | Strzala | 33/522 |
| 3,921,303 | 11/1975 | Zappia | 33/522 |
| 4,278,173 | 7/1981 | Pemberton et al. | 33/542 |
| 4,417,662 | 11/1983 | Nicholson et al. | 209/522 |
| 5,313,847 | 5/1994 | Giometti | 73/865.8 |

FOREIGN PATENT DOCUMENTS 2240103  2/1974  Germany ............... 209/522

*Primary Examiner*—Thomas B. Will
*Attorney, Agent, or Firm*—Spencer T. Smith

[57] ABSTRACT

A machine for gaging the inner diameter and outer diameter of a bottle opening comprising a telescoping gage including an inner plug gage and an outer ring gage. The plug gage includes a plug gage tube with a plug gage at one end. The ring gage includes a ring gage tube with a ring gage at one end, a support set-up for supporting the plug gage tube for axial displacement within the ring gage tube including a first annular collar secured to the inner diameter of the ring gage tube, a second annular collar secured to the outer diameter of the plug gage tube. A first spring compressively located between the collars urges the plug gage tube to a fully advanced position. A second spring urges the ring gage tube to a fully advanced position along the plug gage tube, and an arrangement for displacing the telescoping gage between a fully retracted position and a fully advanced position, an arrangement for preventing relative displacement between the plug and ring gage tubes as the telescoping gage is displaced to a selected position between the fully retracted and fully advanced positions.

3 Claims, 4 Drawing Sheets

PLUG GAGING MACHINE

The present invention relates to machines which inspect the inner and outer diameter of the opening of a bottle.

BACKGROUND OF THE INVENTION

Such inspection is carried out by axially driving a plug gage downwardly into the bottle opening and then axially driving a ring gage downwardly around the top of the bottle. U.S. Pat. No. 5,313,847 discloses a state of the art plug gaging machine.

Many inspection devices can inspect at the rate of 400 bottles per minute. The above referred to plug gaging machine cannot operate at such speeds for all bottle sizes.

It is accordingly an object of the present invention to provide an improved plug gaging mechanism which can operate at such rate for all bottle sizes.

Other objects and advantages of the present invention will become apparent from the following portion of the specification and from the accompanying drawings, which illustrate, in accordance with the mandate of the patent statutes, a presently preferred embodiment of the invention.

BRIEF DESCRIPTION OF THE DRAWING

Referring to the drawings.

DESCRIPTION OF THE PREFERRED EMBODIMENT

Figure 1:
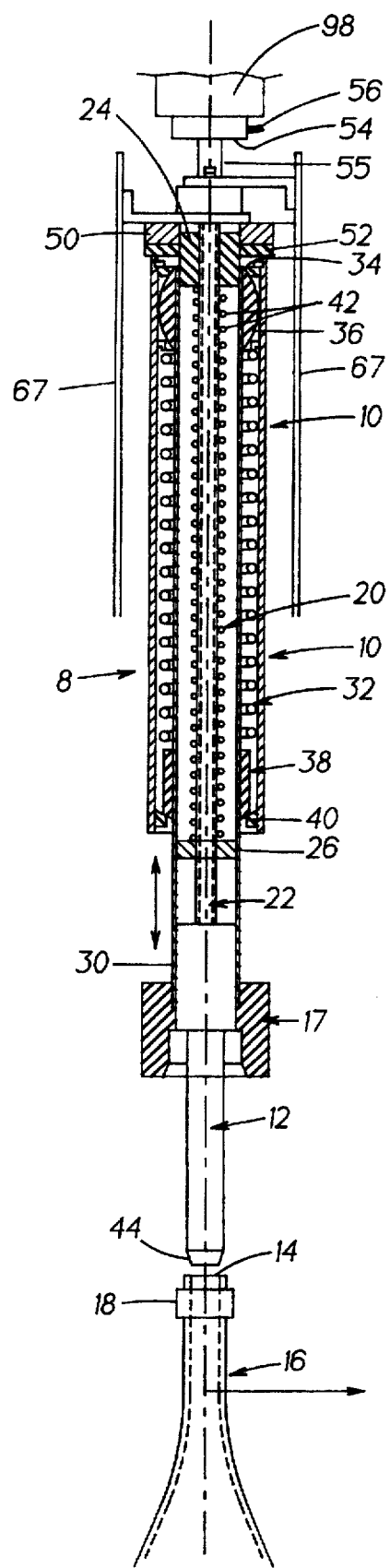
FIG. 1 is a side elevational view of a portion of a plug gaging mechanism of a bottle inspecting machine made in accordance with the teachings of the present invention.

The gaging mechanism 8 includes a driving tube 10 which is mounted on the inspection machine for vertical displacement downwardly from an up position to a first position whereat the plug gage 12 enters the finish (the opening 14 of the bottle 16) and then downwardly to a second position whereat the ring gage 17 receives the top 18 of the bottle.

A plug gage spring 20 is compressively located around the plug gage tube 22 between an upper collar 24 which is secured to the plug gage tube and a lower collar 26 which is secured to the I.D. of ring gage tube 30 to maintain the plug gage normally fully extended.

Should however the plug gage strike the top of the bottle 16 and not enter the opening 14, the driving tube 10 can continue its downward movement without damaging the gage since the upper collar 24 can continue downwardly relative to a stationary lower collar further compressing the spring 20. Similarly, the ring gage 17 is secured to a ring gage tube 30 and a ring gage spring 32 is compressively located around the ring gage tube 30 between ball 34 and socket 36 bushings and the upper 38 of a pair of taper bushings. The upper taper bushing 38 is secured to the outer diameter of the ring gage tube 30 and the lower taper 40 bushing is secured to the inner diameter of the driving tube 10. The upper portion of the ring gage tube 30 passes through the hole 42 of the ball 34.

In operation, should the bevelled surface 44 of the plug gage strike the finish the plug gage will pivot about the center of the ball thereby enabling the plug gage to enter the opening 14. As this plug gage is tilted, the upper taper bushing 38 rides up the lower taper bushing 40 raising the cap 50 which is secured to the ring gage tube off the top 52 of the driving tube 10 thereby providing the necessarily clearance enabling the cap 50 and hence the plug gage tube 22 to pivot. Once the plug gage has entered the finish, the ring gage spring 32 will center the plug gage allowing the cap 50 to once again close the top 52 of the driving tube 10. A cap 54 is secured on the end of a threaded post 55 by a set screw 56.

Figure 2:
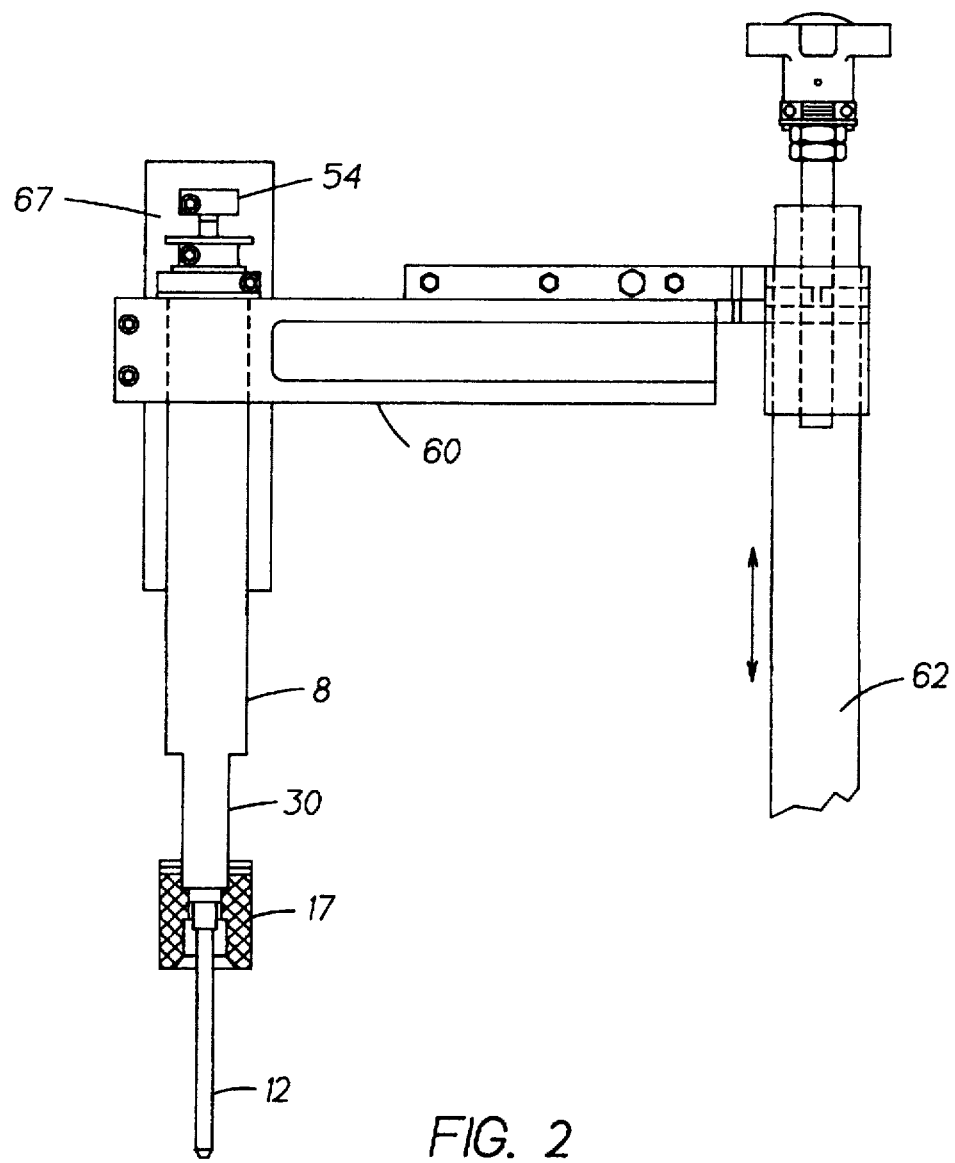
FIG. 2 is a side view showing the portion of the plug gaging mechanism shown in FIG. 1 and its support.

The plug gaging mechanism 8 is mounted on a horizontal bracket 60 (FIG. 2) which is secured to a vertical follower 62 which follows the surface of a cam (not shown). The cam controls the repetitive vertical displacement of the plug gaging mechanism from its uppermost retracted position to a separation position shown in FIG. 1, where the plug 12 is slightly above the top of the bottle, to its fully advanced or down position.

Secured to the machine frame 64 (FIG. 3) is a sensor box 66 for the plug gaging mechanism. Sensors (not shown) which cooperate with flags 67 (FIGS. 1 and 2) are secured to the sensor box as is supporting electronics. Secured to this sensor box is a support bracket 68 which is defined by a pair of opposed vertical struts 70, a pair of side gussets 72, which are secured to the vertical struts with suitable fasteners 74, and a top member 76 which is secured to the side gussets with suitable fasteners 78.

A linear bearing 80, which is supported by a bearing block 82 secured to the top member by suitable fasteners 84, receives a spring rod 86 which is connected to a lower pad 88. The rod extends upwardly beyond the upper pad. A first compression spring 90 is located on the spring rod between the lower pad and the linear bearing. A second compression spring 91 is located on the uppermost portion of the rod between the collar 94 and a cap screw 92. The lower pad has a steel upper portion 96 which is secured to the spring rod and a plastic lower portion 98 which is attached to the steel upper portion. Nylon spring bearings 93 help to keep the springs centered on the spring rod. The cap is releasably secured to the spring rod and can be lowered to adjust the tension of the upper compression spring.

Figure 3:
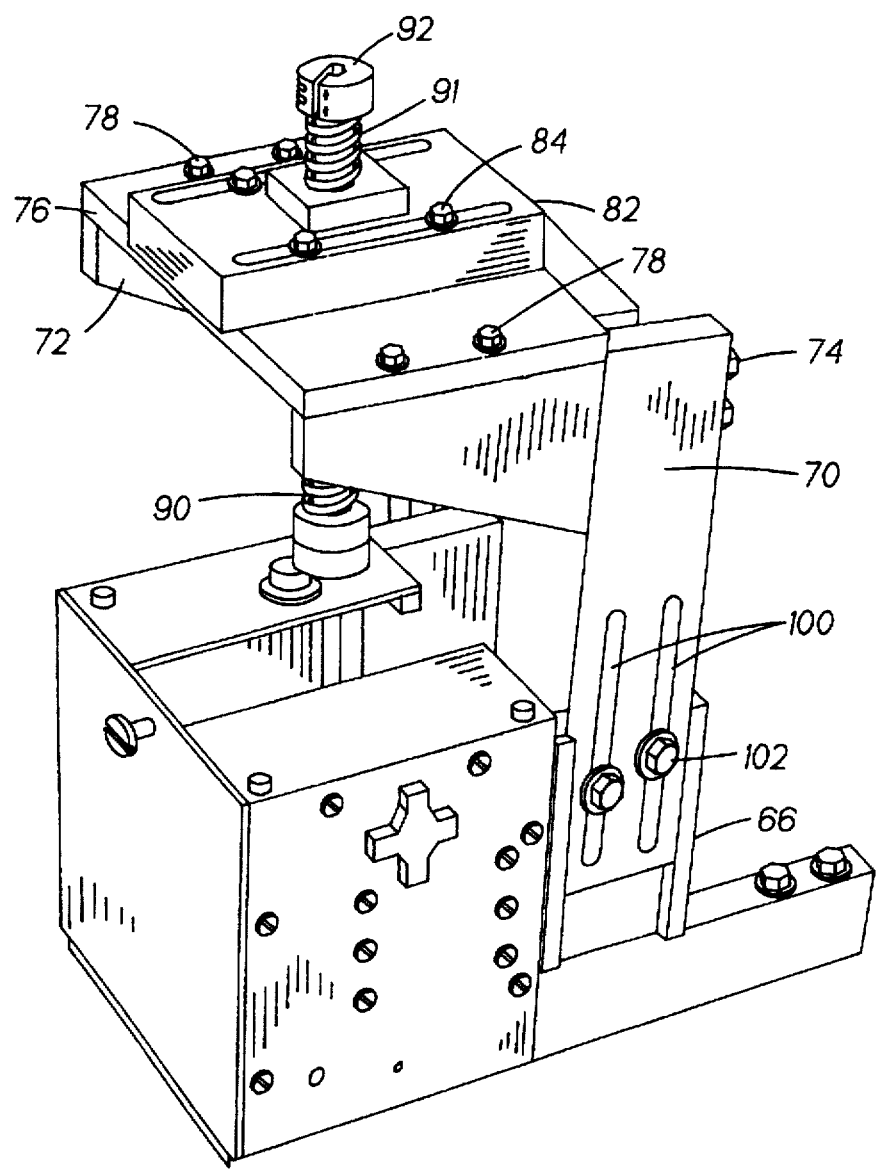
FIG. 3 is a top oblique view of a sensor box for the portion of the plug gaging mechanism shown in FIG. 1 with the remaining portion of the plug gaging mechanism secured to the sensor box.
Figure 4:
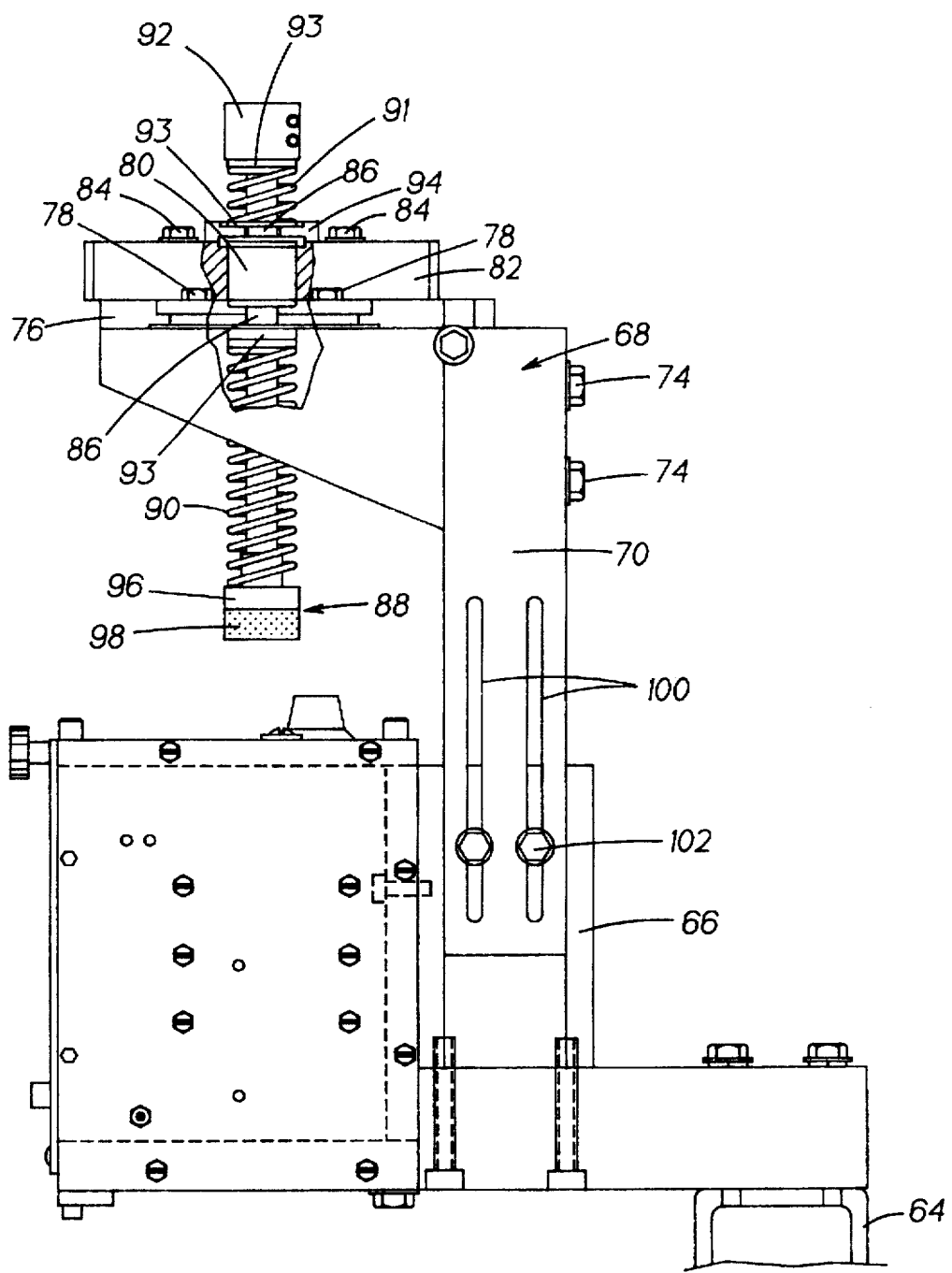
FIG. 4 is a side view of the mechanism shown in FIG. 3.

The support bracket 68 vertical struts 70 have a pair of elongated slots 100 for receiving suitable screws 102 for connecting the vertical struts to the sensor box 66. This permits adjustment of the support bracket 68 to locate the bottom surface of the lower pad, as shown in FIGS. 3 and 4, to be in contact with the top surface of the cap 54 of the plug gaging mechanism when the plug 12 of that mechanism is at the position shown in FIG. 1. As a result, further downward displacement of the plug gaging mechanism will separate the cap from the lower pad. The separation of the upper cap 54 from the lower pad permits the telescoping gage to operate in the disclosed manner with the cap 52 lifting off the tube 10 and tilting if the plug 12 strikes the top of the bottle. When the plug gaging mechanism returns to the position shown in FIG. 1 on its return to the fully retracted position, the cap will again engage the lower pad and will stay in engagement as the plug gaging mechanism continues its displacement to the fully retracted position. The strength of the rod compression spring 90 is selected so that during the displacement of the plug gaging mechanism between the position illustrated in FIG. 1 and the fully retracted position, the top 52 of the driving tube will be maintained in engagement with the cap 50 of the telescoping gage.

I claim:

1. A machine for gaging the inner diameter and outer diameter of a bottle opening comprising telescoping gage means including inner plug gage means and outer ring gage means, said plug gage means including a plug gage tube with a plug gage at one end, said ring gage means including a ring gage tube with a ring gage at one end, means for supporting said plug gage tube for axial displacement within said ring gage tube including
   - a first annular collar secured to the inner diameter of said ring gage tube,
   - a second annular collar secured to the outer diameter of said plug gage tube,
   - first spring means compressively located between said collars for urging said plug gage tube to a fully advanced position, means for displacing said plug gage tube between an up position and a down position, vertically compressible means including a pad at the bottom thereof, and support means for supporting said vertically compressible means so that said pad will be located vertically above said plug gage tube at a location intermediate said up and down positions of said plug gage tube.

2. A machine for gaging the inner diameter and outer diameter of a bottle opening according to claim 1, wherein said vertically compressible means comprises a spring.

3. A machine for gaging the inner diameter and outer diameter of a bottle opening according to claim 1, wherein said intermediate location is slightly above the top of a bottle to be inspected.

* * * * *